United States Patent [19]

Barrett et al.

[11] 4,217,938

[45] Aug. 19, 1980

[54] APPARATUS AND METHOD FOR MAKING DYNAMOELECTRIC MACHINE WINDINGS

[75] Inventors: Eugene R. Barrett, Columbia City; Richard B. Arnold, Fort Wayne, both of Ind.

[73] Assignee: General Electric Company, Fort Wayne, Ind.

[21] Appl. No.: 19,835

[22] Filed: Mar. 12, 1979

[51] Int. Cl.$^3$ ............................ B21F 3/00; H02K 15/04
[52] U.S. Cl. .................................. 140/92.1; 29/596; 29/736
[58] Field of Search ............... 29/596, 605, 732, 736; 140/92.1, 92.2

[56] References Cited

U.S. PATENT DOCUMENTS

| Re. 27,415 | 6/1972 | Cutler et al. | 29/596 |
|---|---|---|---|
| 3,510,939 | 5/1970 | Smith | 29/605 |
| 3,514,837 | 6/1970 | Smith | 140/92.1 |
| 3,579,791 | 5/1971 | Arnold | 140/92.1 |
| 3,672,026 | 6/1972 | Cutler et al. | 140/92.1 |
| 3,672,027 | 6/1972 | Arnold | 140/92.1 |
| 3,672,040 | 6/1972 | Arnold | 140/92.1 |
| 3,765,080 | 10/1973 | Lauer | 140/92.1 |
| 3,872,897 | 3/1975 | Droll et al. | 140/92.1 |
| 3,967,658 | 7/1976 | Arnold | 140/92.1 |
| 3,973,601 | 8/1976 | Arnold et al. | 140/92.1 |
| 3,977,444 | 3/1976 | Lauer et al. | 140/92.1 |

Primary Examiner—Carl E. Hall
Attorney, Agent, or Firm—Ralph E. Krisher, Jr.

[57] ABSTRACT

Methods and apparatus are disclosed for producing dynamoelectric machine coil groups or winding poles. A clamp device, relatively axially movable coil form and turn receiver, and relatively rotatable flyer are used, and interpole wire segments are established by intercepting, at a fixed location, a segment of wire extending between the form and flyer prior to complete cessation of relative rotation between the same.

Intercoil winding segments are also accurately established. For example, an intercoil winding segment is deflected out of the winding plane and in a direction toward a subsequent winding form stage during the development of the last turn of a coil developed on the previous winding stage. Deflection of the intercoil winding segment is preferably accomplished substantially concurrently with advancement of the winding form relative to the turn receiver. In one form, a inclined ramp is moved into the winding plane and into interfering relation with an intercoil winding segment as the winding segment is being developed and as a subsequent winding stage is being moved into the winding plane.

40 Claims, 6 Drawing Figures

APPARATUS AND METHOD FOR MAKING DYNAMOELECTRIC MACHINE WINDINGS

CROSS REFERENCE TO RELATED APPLICATIONS

The subject matter of the present application is generally related to the subject matter contained in application Ser. No. 15,054 which was filed on Feb. 26, 1979 in the name of Walter P. McNeal and Ronald H. Brown. The subject matter of the present application is also at least generally related to the subject matter contained in Smith U.S. Pat. No. 3,510,939 which issued May 12, 1970; Smith U.S. Pat. No. 3,514,837 which issued June 2, 1970; Cutler et al U.S. Pat. No. Re 27,415 which issued Apr. 2, 1969; Arnold U.S. Pat. No. 3,579,791 which issued May 25, 1971; Cutler U.S. Pat. No. 3,672,026 which issued June 27, 1972; Arnold U.S. Pat. No. 3,672,027 which issued June 27, 1972; Arnold U.S. Pat. No. 3,672,040 which issued June 27, 1972; Lauer U.S. Pat. No. 3,765,080 which issued Oct. 16, 1973; Lauer et al U.S. Pat. No. 3,977,444 which issued Aug. 31, 1976; and Arnold et al U.S. Pat. No. 3,973,601 which issued Aug. 10, 1976. All of the just-mentioned patents as well as the above-referenced McNeal et al application are all assigned to the assignee of this application. Another patent which is directed to subject matter that is also related to the above-identified patents is Droll et al U.S. Pat. No. 3,872,897 which issued Mar. 25, 1975. Still another patent, commonly assigned herewith relevant to the subject matter of this application is Arnold U.S. Pat. No. 3,967,658 which issued July 6, 1976. The entire disclosures of the above-referenced application and all of the above-referenced patents are incorporated herein by reference.

BACKGROUND OF THE INVENTION

The present invention relates generally to apparatus and methods for use when developing wound coils and, more particularly, to apparatus and methods for handling and locating predetermined segments of magnet wire used for developing coils of dynamoelectric machines—especially electric motors.

During one process for winding coils for dynamoelectric machines (e.g., electric motors) magnet wire is fed from a supply along a predetermined path to a wire dispenser which is utilized during generation of winding turns for one or more coils in two or more coil groups which, subsequently, are disposed in slots of the magnetic core.

One type of coil winding operation has become known as "wind and shed" or "shedder" winding and may be carried out, for example, with equipment of the type illustrated in the above-referenced related application or any of the above-referenced patents. In order to more clearly point out what is considered by applicants to be their invention, extensive details of winding equipment are not specifically illustrated or specifically described herein and for that reason, the entire disclosures of all of the above-referenced patents and the related application are specifically incorporated herein by reference.

The shedder type of coil winding operation is generally accomplished by holding a coil form assembly in a winding plane while turns of a first size of wire are developed thereabout. Then, while turns continue to be generated, at least part of the form assembly is jumped axially relative to the winding plane and a winding turn receiving mechanism. Alternatively, of course, the receiving mechanism and coil forms may rotate or the wire dispensing and receiving mechanisms may be jumped relative to the coil core assembly. When any of the just-mentioned approaches are followed, however, a plurality of winding turns will be generated in substantially one given plane. Depending upon the speed of winding turn generation (i.e., the winding flyer rpm), and the size and type of material used in the winding, oscillation or flutter of the wire will occur during the winding operation. Excessive oscillation or wire flutter may in turn interfere with smooth and uniform shedding of wire turns. One of the approaches that has been long recognized for the purpose of minimizing or controlling wire flutter or oscillation is the use of a masking plate as shown, for example, by masking plate 82 in the above-referenced Smith U.S. Pat. No. 3,510,939.

When at least two coils groups ("coil group" also being referred to as a "pole" in published literature) are formed in a turn receiving mechanism prior to transfer to a magnetic core structure, one of the more common approaches is to develop a first coil group in the mechanism or receiver; index the receiver; and then wind a second plurality of turns so that a second pole or coil group is established in the receiver. It will be understood that the winding direction (e.g., relative flyer rotational direction) may be reversed from one pole to the next. Moreover, it will be understood that the receiver may be indexed in either a clockwise or counterclockwise direction about its longitudinal center. In any of these cases, it has now become the general practice to provide a mechanism and methods whereby a segment of an interpole (or intercoil group) lead wire is grasped after one pole (or coil group) has been established in the receiver and prior to indexing of the receiver. In some cases, an extra segment of wire is actually pulled from the wire dispenser or flyer and the grasped segment is released after at least some turns for a subsequent pole have been generated. Details of this type of procedure are spelled out in more detail in the above-referenced Arnold U.S. Pat. No. 3,967,658.

In one approach, as typified for example by the above-referenced Arnold U.S. Pat. No. 3,967,658, an interpole lead puller intercepts and grips a segment of an interpole lead wire or "interpole connection" as it is sometimes called in the art. After a complete set of coils or poles have been established in the coil receiving mechanism; equipment and approaches of the type taught in said referenced Arnold U.S. Pat. No. 3,967,658 will have established the interpole leads or "interpole connections" around the exterior or outer periphery of a receiving mechanism (clearly revealed, for example, in FIG. 5 of said referenced Arnold U.S. Pat. No. 3,967,658).

In still other approaches as taught, for example, in the above-referenced Smith U.S. Pat. No. 3,510,939; an interpole clamp is utilized (as represented for example by clamp means 84 in FIG. 1 of said referenced Smith U.S. Pat. No. 3,510,939) to establish an interpole lead that would be disposed within the interior of a coil receiving mechanism. When such mechanism is in the form of a circular array of longitudinally extending pins, the interpole wire or connection established by the just-mentioned Smith approach will occur within the bore defined by the circular array of blades, pins, or other gap establishing elements.

Whether the interpole connection or wire is disposed externally of or internally of the coil receiving mechanism depends upon a number of factors. For example, it may be preferred for some motor models or when using wire of a particular size to have the interpole connection or lead wire located externally of the coil receiving mechanism. On the other hand, in motors of other models or when using wire of other sizes, it may be preferred to establish the interpole wire or connection within the coil receiving mechanism. At least some problems are encountered and associated, however, with either of the approaches that have just been mentioned.

For example, when the interpole wire or connection is to be established exteriorly of the coil receiving mechanism as taught, for example, in the above-referenced Arnold U.S. Pat. No. 3,967,658; a relatively complex and therefore relatively expensive to produce and maintain mechanism must be provided in order to intercept a segment of wire at the desired time and thus establish the interpole wire or connection. On the other hand, when the relatively more simple and straightforward approach taught, for example, in the above-referenced Smith U.S. Pat. No. 3,510,939 is followed; the accuracy and reliability of the operation of the interpole wire clamping mechanism is critically dependent upon maintaining virtually infallible control over the position of the winding flyer (or other wire dispensing mechanism) at the instant that the clamping means is actuated. The reasons for the need to precisely and consistently control the flyer position and interrelate such position to actuation of a clamping means may be better understood with reference to the detailed description that is presented hereinbelow. For the moment, however, it should be understood that it would be desirable to provide new and improved methods and apparatus for use in developing dynamoelectric machine windings having at least two coil groups or poles interconnected by an interpole wire segment or connection such that the interpole wire segment is disposed interiorly of a turn receiving mechanism and yet wherein the critical interdependence of a flyer stopping position and operation of an interpole wire segment clamping device is eliminated. In other words, it would be desirable to provide improved methods and apparatus whereby an interpole wire segment or connection is established within a region having its outer boundaries established by a coil receiving means consistently and reliably virtually without regard to the final stopping position of a wire dispensing means relative to the position of the clamping means.

Accordingly, it is a general object of the present invention to provide new and improved methods and apparatus for establishing and handling segments of wire that interconnect coil groups (or poles) that are disposed in a winding turn receiver.

It is another object of the present invention to provide new and improved methods and apparatus that include provisions for establishing an interpole wire segment.

It is yet another general object of the present invention to provide new and improved methods and apparatus for developing two or more coil groups, two of which are interconnected by an interpole winding segment that is reliably and accurately positioned during a dwell or interruption of relative movement between a flyer and coil form assembly, but the formation of which is not dependent upon critical relative positioning between such flyer and coil form.

While the above discussion has been addressed primarily to "interpole" or "intercoil group" wire segments or connections; problems have also been long recognized in connection with precisely establishing "intercoil" winding segments "on the fly", and especially at elevated winding speeds in excess of, for example, 2,000 rpm. The problems associated with establishing suitable intercoil winding segments with consistent accuracy in shedder type winders are discussed, for example, in the above-referenced Lauer et al U.S. Pat. No. 3,765,081. Still another patent that discusses, among other things, problems associated with consistently accurate placement of intercoil winding segments is the above-referenced Arnold et al U.S. Pat. No. 3,973,601.

The importance of avoiding misplaced intercoil winding segments may be better understood and appreciated by referring to, for a moment, parts of the just-mentioned Arnold et al U.S. Pat. No. 3,973,601 and the just-mentioned Lauer U.S. Pat. No. 3,765,080.

As pointed out in the Arnold et al patent, shedder type winding equipment utilizes a turn receiving device and one or more coil forming parts that interfit with one another with relatively telescoping mutually cooperating relationships. Typically, winding turn receiving mechanisms with this kind of equipment establish or define turn receiving gaps or slots; and winding turns for a given coil are moved along predetermined ones of such gaps while each coil is being developed due to individual turns being generated about the winding forms. Each set of these predetermined gaps correspond with two predetermined slots of a stator core, and when an intercoil wire segment is inadvertently placed in the wrong gap, such misplaced wire segment will almost inevitably be broken when it ultimately is axially inserted into the stator core. Misplaced intercoil wire segments, as noted in both said Arnold et al and Lauer patents, have been the subject of diverse approaches in attempts to solve the problem. For example, intensive efforts have been made to increase the accuracy of the operational interrelationships of various parts, to improve such parts themselves, and to improve the relative movement and timing of such movement between such parts so that the winding turn receiving mechanism and coil forming mechanism may be axially moved relative to one another in a particular manner and at a particular time to overcome the misplaced intercoil wire segment problem. For example, many complex notches, ledges, and hooks have been provided on winding forms in order to insure that an intercoil wire segment will be provided in a desired relative location by insuring that a winding segment transitions from one coil form winding stage to another during the time that the winding forms are being advanced through the winding plane. Many efforts have also been made to insure that jumping of the coils forms relative to the winding turn receiving mechanism occurs precisely within optimum "windows" as defined, for example, in said Arnold et al patent.

Thus, it should now be understood that it is yet another object of the present invention to provide improved methods and apparatus for developing coil groups with shedder type winding equipment such that intercoil winding segments will be consistently and accurately positioned within a coil group without necessarily requiring concern for jump speed, complex winding form geometry, and undue concern for accomplishing coil form advancement only during a relatively small predetermined jump "window".

SUMMARY OF THE INVENTION

While carrying out various ones of the above objects of our invention, in one form thereof, we have provided methods and apparatus that involve producing at least two coil groups or poles of winding turns, wherein each such group or pole is formed of at least one coil; and wherein adjacent poles or groups are interconnected by precisely located interpole winding segments.

In more preferred forms, clamp means, relatively axially movable coil form means and winding turn receiving means, and relatively rotatable wire dispensing means are utilized while generating a first pole in the receiving means, with the receiving means and form means in first predetermined relative positions; by relatively rotating the form means and wire dispensing means, stopping the relative rotation of the dispensing means and form means as the last turn of the first pole is formed; intercepting, at a fixed location, a segment of wire extending between the form means and dispensing means prior to complete cessation of relative rotation between the form means and dispensing means, and thereby establishing an interpole wire segment extending between the form means and the fixed location. Subsequently, the form means and winding turn receiving means are moved relative to one another, assurance is attained that all of the winding turns of the first pole are disposed in the receiving means, and the form means and receiving means are relatively moved away from one another so that the turn receiving means is free to index relative to the form means in preparation for the development of a second pole (or coil group). While assurance is being attained that all of the turns of the first pole are disposed within the receiving means, and while the segment continues to be intercepted, the interpole wire segment is positioned in a fixed clamp means in the event that it has not been previously so positioned. After the interpole wire segment has been so clamped, there is no longer a critical need to maintain the interception of the interpole wire segment so the means utilized for intercepting such segment preferably is operatively conditioned to assume a non-intercepting mode after clamping is accomplished.

After the turn receiving means and coil form means have been relatively indexed in preparation for development of the second pole, the clamp means is actuated to clamp the interpole wire segment. Alternatively, depending upon the actual physical size of the coils in the first pole, the geometry of the turn receiving mechanism, and the amount of wire needed (if any) for the interpole wire segment; the clamp means may be actuated to clamp the interpole wire segment before the form means separates from the turn receiving means and thus before indexing of the turn receiving means. In either event, the interpole wire segment is accurately located relative to the clamping means because of the interception of the segment of wire at the fixed location regardless of the final stopping position of the wire dispensing means.

After the turn dispensing means has been indexed as needed, and the form means have been advanced to a shedding relationship with the turn receiving means; the wire dispensing means recommences operation in order to generate turns of the second pole, with recommencement of dispensing means operation initially taking place while the interpole winding segment continues to be clamped and held by the clamping means. However, after an initial number of winding turns have been generated, the clamping means releases the interpole wire segment.

In still an even more preferred mode of practicing the present invention, the interpole wire segment is established in a region within the interior of the turn receiving means rather than externally of the turn receiving means.

Apparatus particularly useful for carrying out the invention in one form thereof includes a movable ramp that may conveniently be supported on a masking plate which in turn can provide the desirable result of minimizing wire oscillation or flutter during a winding cycle. The inclined ramp is positioned relative to the winding plane and so dimensioned that it can be selectively moved into interfering relation with the winding plane and a wire segment moving therein which extends between the form means and the wire dispensing means. When the movable inclined ramp is used in conjunction with accurately establishing interpole wire segments, the ramp is movable into its interfering relationship during the last revolution of the flyer associated with development of a given winding pole. Then, as the wire dispensing means approaches its stop or dwell position, the wire segment extending therefrom is deflected out of the winding plane by the inclined ramp and continued movement of the wire dispensing means carries the wire off the ramp and into engagement with a wire abutment. Thereafter, any continued movement of the wire dispensing means simply causes the wire to bend or deflect at the point where it engages the abutment. However, the abutment is so positioned and located relative to the winding form and stationary clamping means that the segment of wire extending between the form and abutment means will overlie and be properly positioned for clamping engagement by the stationary clamping means. While the use of an inclined ramp is desirable, and is included in more preferred embodiments of the invention, the invention may also be practiced while utilizing only a movable abutment means which moves into interfering relation with the winding plane and a wire segment moving therein.

When practicing another aspect of the invention, in a preferred form thereof, we accurately and precisely establish intercoil winding segment locations. For example, we deflect an intercoil winding segment out of the winding plane and in a direction toward a subsequent winding form stage during the development of the last turn of a coil developed on the previous winding stage. Deflection of the intercoil winding segment is preferably accomplished substantially concurrently with advancement of the winding form itself relative to the winding turn receiving means which causes a winding stage positioned in the winding plane for development of a first coil to be moved out of the winding plane, with a second winding stage for a second coil moving into the winding plane. In one preferred form of apparatus useful in conjunction with practicing the invention just described, an inclined ramp is moved into the winding plane and into interfering relation with an intercoil winding segment as the winding segment is being developed and as a subsequent winding stage is being moved into the winding plane for the development of a subsequent coil within the same coil group or pole.

The subject matter which we regard as our invention is particularly pointed out and distinctly claimed in the concluding portion of this specification. The inventions themselves, however, together with further objects and advantages thereof, may be best understood by reference to the following description taken in conjunction with the accompanying drawings wherein like reference numerals have been utilized to denote like parts.

DESCRIPTION OF THE PREFERRED EMBODIMENTS

Initially, it is noted that the methods described herein, and the apparatus and structures illustrated and specifically described herein in connection with the practice of our preferred methods are presented only for the purpose of enabling persons skilled in the art to utilize the present invention. Moreover, many of the procedures disclosed herein and structural features embodying different aspects of our invention may be used with coil winding equipment other than the particular types illustrated herein.

Figure 1:
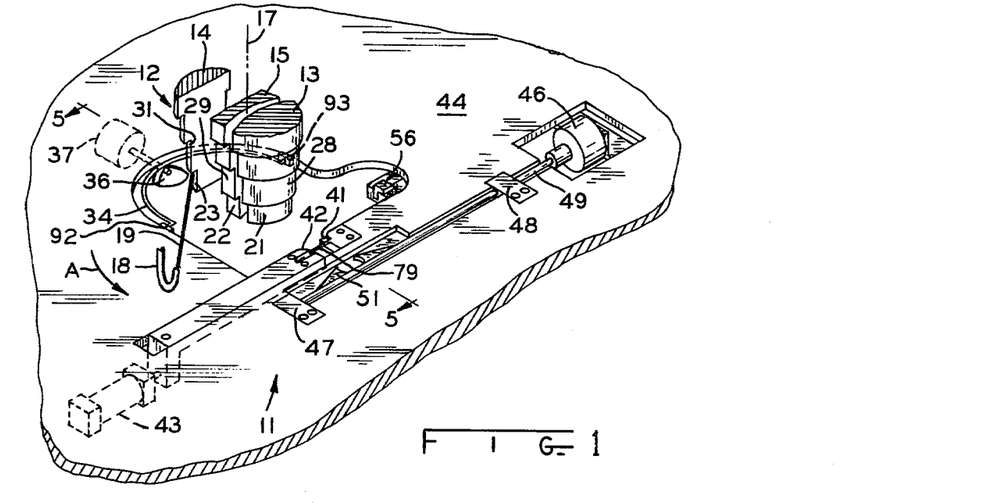
FIG. 1 is a front pictorial view providing a perspective type illustration of apparatus embodying the invention in a preferred form and which may be utilized in the practice of the invention in a preferred form, with substantial portions of the apparatus broken away and/or removed for clarity of illustration.

In FIG. 1, winding apparatus 11 has been illustrated which includes winding turn formation means that have been illustrated as a multi-part winding form assembly 12. As illustrated, assembly 12 includes a front form part 13, a rear form part 14, a middle form part 15, and a stripper element 16 (see FIG. 3). As will be understood, the form assembly 12 is supported for selectively controllable vertical movement in the same general direction as the winding axis 17; and a wire dispensing means, illustratively depicted for purposes of exemplification as including flyer arm 18, is rotatable relative to the form assembly about the longitudinally extending axis 17 so that winding turns are successively generated about the winding stages of the form assembly with magnet wire that is wrapped about the winding form assembly by the flyer.

Figures 3, 4:
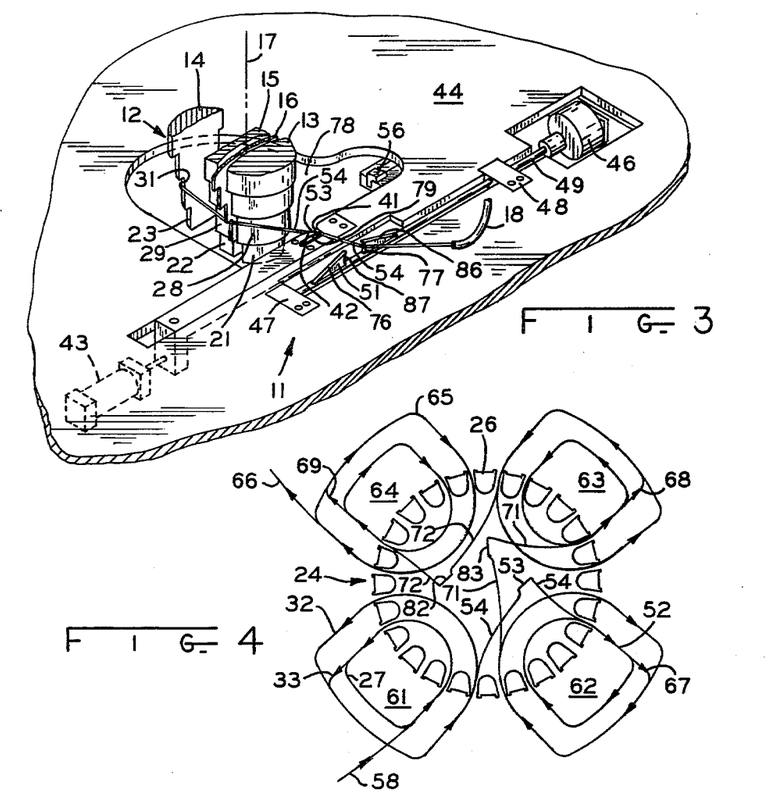
FIG. 3 is another view of the same apparatus shown in FIGS. 1 and 2 but with parts thereof shown in relative positions corresponding to a later point in time during the practice of one of the preferred methods.
FIG. 4 is a plan view of the turn receiving mechanism portion of the apparatus shown FIGS. 1–3 (but omitted therefrom for the purpose of clarity) with four coil groups or poles disposed therein after being generated, turn by turn about the forms illustrated in FIGS. 1–3; with both the intercoil and intercoil group (or interpole) winding segments clearly revealed.
Figure 5:
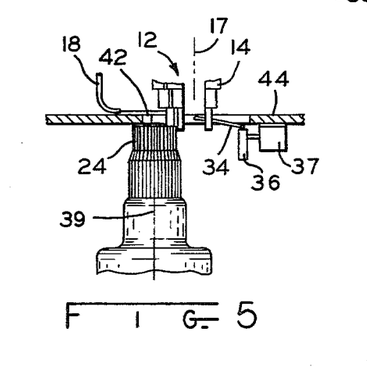
FIG. 5 is a side elevation of the apparatus shown in FIG. 1 when looking in the direction of the lines 5—5 in FIG. 1, with the relative positioning of the parts shown in FIG. 5 corresponding to a different point in time during the practice of other aspects of the present invention.
Figure 6:
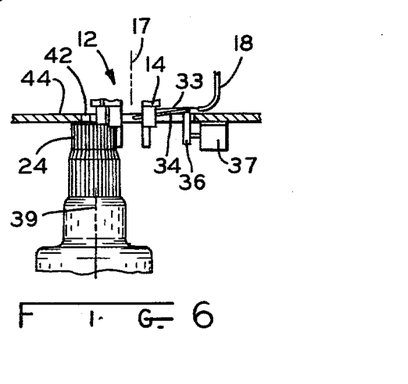
FIG. 6 is a view similar to FIG. 5 but showing the parts illustrated therein in different relative positions as compared to the relative positions thereof depicted in FIG. 5.

With the relative positioning of parts shown in FIG. 1, magnet wire 19 extends from the flyer arm 18 to a first winding stage made up of the first stages 21, 22, 23 of the form assembly. So long as the parts illustrated in FIG. 1 remain in the relative positions shown, and flyer arm 18 continues to rotate about axis 17, wire segments extending between the coil form assembly and the flyer arm will be wound in substantially a single plane about the coil form assembly, with each new winding turn forcing the last previously generated winding turn downwardly as viewed in FIG. 1. As winding turns continue to be generated about the first winding stage, the winding turns previously generated about the same winding stage are shed downwardly into winding turn receiving gaps of a receiving mechanism positioned to receive the winding turns as they are shed from the coil form assembly. One such receiving means is illustrated in FIGS. 4–6 and it will be appreciated that with the particular tools or receiver 24 illustrated therein, vertically extending blades or pins 26 actually intermesh with the coil form assembly. For ease of understanding, one complete operational cycle of the apparatus 11 will now be described without particular emphasis on the novel features and approaches which embody the present invention. However, later portions of this specification focus on the novel aspects of the procedures and equipment disclosed herein.

Flyer arm 18 rotates about axis 17 and generates as many turns as might be desired for an innermost coil. One such innermost coil is illustrated by coil 27 in FIG. 4. Once a predetermined number of turns for coil 27 have been generated about the first winding stage of the coil form, the coil form is jumped or advanced downwardly as viewed in FIG. 1, so that the second winding stage moves into the winding plane. The second winding stage, as will be understood, is comprised of the second stages 28, 29, 31 of the coil form assembly. As the coil form assembly is advanced downwardly relative to the winding plane, an intercoil winding segment is established which interconnects the innermost coil 27 and the subsequently formed coil 32. In FIG. 4, this intercoil segment or connection is denoted by the single strand of wire 33. During the period of advancement of the coil form or "jump" of the coil form when the intercoil connection 33 is being established, bail 34 (see FIGS. 1, 5, and 6) is elevated from its rest position under the action of a cam 36 driven by rotary solenoid 37. Thus, during a portion of a revolution of the flyer arm, the bail 34 is moved into the relative position thereof depicted in FIG. 6. For purposes of clarity, the bail 34 and mechanisms associated therewith have been omitted from FIGS. 2 and 3. However, substantial additional description involving the novel bail 34, its associated hardware, and novel procedural steps performed in conjunction with operation of bail 34 are pointed out in more detail hereinbelow.

After the coil form assembly has jumped to the second winding stage, a predetermined number of turns for the second coil 32 are formed. Assuming that only two coils (coils 27, 32 shown in FIG. 4) are to be formed for the first coil group or first pole, the flyer arm 18 will come to a rest or stop position as the last turn of coil 32 is generated. Thereupon, the coil form assembly and stripper 16 (see FIG. 3) both advance downwardly to insure that all winding turns have been shed into the coil turn receiver 24. After this, the stripper 16 is raised and coil form assembly retracts to its initial dwell position, and the receiver 24 is indexed about its longitudinally extending axis 39. In addition to the above operations, clamp jaws 41, 42 are closed by the operation of a pneumatic cylinder 43.

It will be noted that the bail 34, rotary solenoid 37, cylinder 43, and the clamping means which includes jaws 41, 42 are carried by the masking plate 44 for convenience. Also carried by the plate 44 is a second rotary solenoid 46, and two brass inserts 47, 48 which provide sleeve bearing support for an actuating rod 49 which controls a pop-up device 51.

Continuing with the above description, after a predetermined number of winding turns for the coil 32 (see FIG. 4) have been generated about the coil form assembly, deposited in the turn receiver 24, the form assembly has retracted, the clamp 41, 42 has been actuated, and the turn receiver indexed; the coil form assembly once again is moved so that the first stage thereof is in in the winding plane. Then the flyer arm 18 commences to develop another coil by generating the predetermined number of turns desired for the innermost coil 52 of a second coil group (see FIG. 4). After a few turns of the innermost coil 52 have been generated, the clamped portion 53 of the interpole connection or wire segment 54 is released. The above described sequence is then repetitively continued until all of the desired poles or coil groups that are needed have been formed in the turn receiver 24. However, as the final pole or coil group is completed, a final clamp and cut off device 56 is energized to intercept a final segment of magnet wire and sever the magnet wire while holding the end of the segment extending from the flyer. As will be understood, the clamping and cutting mechanism 56 is known in the art and, for convenience, is also supported on the masking plate 44.

Since mechanisms similar to clamping and cutting mechanism 56, and the operation of such mechanisms is known in the art, a detailed description of the same is not included herein. However, it is noted that after a predetermined number of coil groups or poles have been developed in the receiver 24, the receiver 24 is moved away from the winding station and the coil groups are axially transferred into axially extending slots of a stator core. While the receiver moves away from the coil form assembly, the free or distal end of the coil form assembly is maintained in spaced apart relation to the receiver 24. Typically, the distal or bottom end of the form assembly is positioned in a plane above the winding plane, but it should be understood that orientations other than vertical of the axes 17, 39 may be maintained.

During the dwell period of the flyer arm 18, a segment of magnet wire extends from the flyer arm to the clamp portion of the clamping mechanism 56. A receiver then is once again moved into position under the form assembly in preparation for development of an additional number of coil groups or poles. Depending upon the exact equipment utilized and exact processes being utilized, the same receiver 24 may index to and from the winding station. Alternatively, the winding head may be positioned above a turntable having a plurality of coil turn receivers selectively movable into turn receiving position under the coil form assembly. In yet still other arrangements, a series of different receivers may move into turn receiving relationship with the coil form assembly.

In any event, when a turn receiver is moved into position for receiving turns generated about the form assembly, the form assembly is initially advanced relative to the receiver until the winding stage thereof for forming a first coil is located in the winding plane and is in turn shedding relationship with the turn receiver. Thereupon, the flyer arm 18 commences rotating about the coil form assembly while the end of the magnet wire remains clamped by the clamping device 56. However, after a few turns have been generated, the clamp 56 releases the end of the wire. The lead end of the wire, upon release from the clamp mechanism 56, establishes the lead end of the winding being developed. For example, the lead end 58 of the winding illustrated in FIG. 4 was held by mechanism 56 prior to formation of a first number of turns of coil 27.

In the case of the winding illustrated in FIG. 4, the sequence of operations previously described are followed to produce the poles or coil groups 61, 62, 63, and 64.

As the last turn of the last coil 65 is generated, the clamping and severing mechanism 56 is once again actuated into the winding plane to intercept the magnet wire strand extending from the flyer arm and the wire is once again clamped and severed. The free end of the severed wire (i.e., the not clamped end of the severed wire) establishes the finish winding lead 66.

Reference is now once again directed to the intercoil connections or wire segments 33, 67, 68, and 69; as well as the interpole connections or segments 54, 71, and 72, and previously clamped portions 53, 82, 83. The distinction between an *interpole* (or intercoil group) lead or connection and an *intrapole* (or intercoil) connection is once again emphasized in order to avoid confusion. Thus, wire segment 54 is an *interpole* connecting wire segment whereas wire segment 33 is an *intrapole* (or intercoil) connecting wire segment. Reliable and consistent formation of both interpole and intrapole connecting wire segments will now be described in substantially more detail in the context of our new and improved methods and apparatus.

Figure 2:
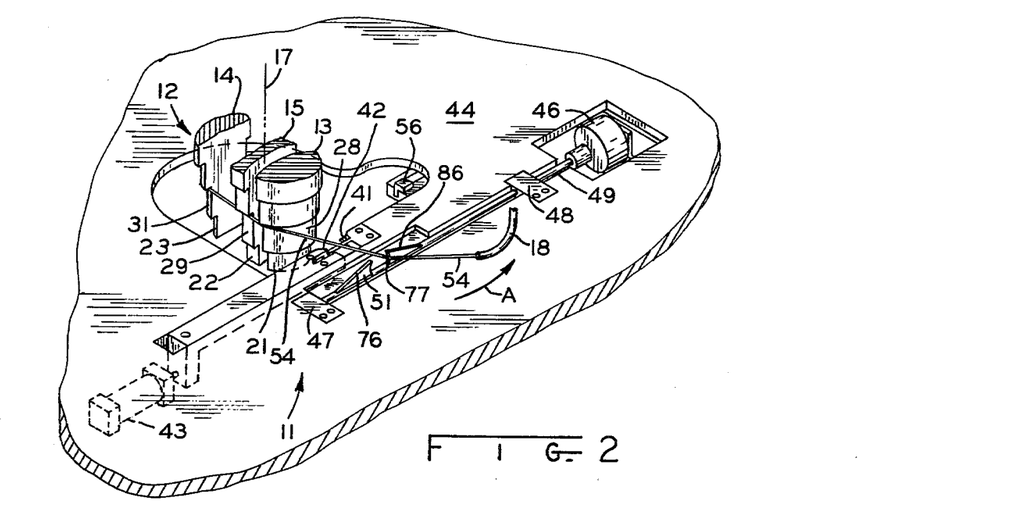
FIG. 2 is a view of the same structure shown in FIG. 1 but during a later point in time in an operational subcycle of the equipment.

With specific reference to FIGS. 1, 2, and 4, it will now be understood that FIG. 1 represents the relative point in time during which turns for the coil 27 are being developed (see FIG. 4). FIG. 2, however, is illustrative of a point in time just as the final turn of the coil 32 has been generated. Thus, as the flyer arm 18 is concluding its final revolution about the coil form assembly required for the production of the coil group or pole 61, the pop-up device 51 is moved from its dwell position beneath the winding plane (as shown in FIG. 1) to an active wire intercepting position in the winding plane as illustrated in FIG. 2. As the flyer arm 18 ceases its rotational movement in the direction of arrow A and drifts (or is braked) to its dwell position, the strand of wire 54 extending between the flyer arm and coil form assembly rides up an inclined ramp 76 established by the pop-up device, is deflected upwardly out of the winding plane, and thereafter snaps downwardly and back into the winding plane and into engagement with abutment surface 77 of the pop-up device. The abutment surface 77 thus defines the exact location of that portion of wire segment 54 that extends between the coil form assembly and the abutment surface, and continued drift or movement of the flyer arm 18 merely causes the wire segment 54 to bend or deflect at the point where it engages the abutment surface 77. As will be understood, the position of pop-up device 51, the coil form assembly, and the interpole clamping device comprised of clamp jaws 41, 42 is such that the portion of wire segment 54 extending between the coil form assembly and abutment surface 77 will be generally positioned above but between the open clamp jaws 41, 42. Thereupon, as pointed out hereinabove, the coil form assembly and stripper device 16 are moved downwardly to insure that all of the wire turns generated about the coil form assembly and intended for pole 61 are shed downwardly into the receiver 24.

As this movement takes place, that portion of wire segment 54 which extends between abutment surface 77 and the coil form assembly is moved downwardly through opening 78 in the masking plate, and a small piece of the segment 54 is bent downwardly over pin 79 and into the grasp of the clamp jaws 41, 42. At this point in time, the clamp jaws 41, 42 may be actuated to clamp the interpole segment 54 at the clamped portion 53 thereof as shown in FIG. 3. Alternatively, actual clamping of the portion 53 may be deferred until the stripper 16 and coil form assembly have traveled to their lower limits of travel and then have been raised from the receiver 24, and the receiver 24 has been indexed in preparation for formation of the next coil group. The exact point in time that wire segment 54 is clamped will depend, among other things, on the physical size of the receiver 24 and a determination as to whether segment 54 should remain unclamped so that additional magnet wire may be pulled from flyer arm 18 during indexing of the receiver 24.

In any event, it is not desirable, as implied by FIG. 3, to close jaws 41, 42 and clamp portion 53 before the form assembly and stripper 16 have completed their downard stroke and shed every turn into the receiver. Thus, it will be understood that the relative position of all of the parts as shown in FIG. 3 would not be coicident in time; and when the form assembly and stripper 16 are in the position shown in FIG. 3, clamp jaws 41, 42 in reality should still be "open". Then, at a later point in time, jaws 41, 42 would close on segment 53.

It thus should be understood that FIG. 3 has been drawn to represent the relative positions of parts at different points in time, in the interest of minimizing the number of drawings figures.

As will be appreciated from a review of FIGS. 1–3, the pop-up device 51 is a relatively uncomplicated mechanism. For example, a standard, commercially available rotary electric solenoid 46 is supported on the plate 44. In one reduction to practice of the invention, a Ledex solenoid model 81840 manufactured by Ledex, Inc. of Dayton, Ohio was utilized as solenoid 48. Connected to the output shaft of the solenoid 46 was approximately nine inches of one-eighth inch (3.18 mm) diameter drill rod which formed rod 49. Journal bearings for the drill rod in turn were provided by holes bored into the bearing plates 47, 48. Steel pieces were then brazed to the drill rod to establish the ramp surfaces 76, 86 and abutment surfaces 77, 87. Although the structure in FIGS. 1–3 show two pieces of steel brazed to the drill rod, it will be understood that a single piece of material could be machined to provide the dual ramp and abutment surfaces and such single piece of steel then would be brazed or otherwise attached to the rod 49.

The reason that a pair of ramp surfaces 76, 86, and a pair of abutments 77, 87 are provided in the pop-up device 51 is that flyer rotation in the apparatus 11 may be both clockwise and counterclockwise. In fact, the winding shown in FIG. 4 has next adjacent poles thereof produced by rotating the flyer 18 in different directions. For example, looking into the paper in FIG. 4 reveals that the poles 61, 63 were formed by counterclockwise rotation of the flyer about the form assembly, whereas poles 62, 64 were formed by clockwise flyer rotation about the coil form assembly.

In another embodiment of the invention, the members that establish the ramps and abutments may be replaced by a single piece of small (e.g., one-eighth inch diameter) rod brazed to the rod 49. With this arrangement, the gap between clamp open jaws 41, 42 will be increased so that the interpole wire segment 54 will overlie the opening in the clamp jaw when the wire segment is pulled against either side of the not shown pop-up dowel rod or pin. Alternatively, the rotary solenoid 46 may be supported by a small pneumatic or hydraulic cylinder which in turn would actually shift the solenoid 46, rod 49, and pop-up rod (brazed to rod 49) so that the position of the abutment surface defined by either side of the pop-up rod would be shiftable to an optimum position, depending upon the the direction of rotation of the flyer arm 18.

This may be better understood by further analyzing FIG. 3 and noting that the abutment surfaces 77, 87 are spaced axially along the rod 49. The different locations of the abutment surfaces 77, 87, is arranged so that an interpole wire segment extending from the form assembly to abutment 77 at the end of counterclockwise movement of flyer arm 18 will overlie the opening between the clamp jaws 41, 42. On the other hand, when flyer arm 18 has been developing windings with a clockwise flyer rotation, an interpole wire segment such as the segment 71 (see FIG. 4) will extend from the coil form assembly to the abutment surface 87 (during formation of such interpole segment 71) and the intermediate portion 83 of this wire segment will overlie the opening between the clamp jaws 41, 42. Again, the use of a small pin or rod in lieu of the wedge shaped members shown (that establish surfaces 77, 87, 76, 86) may be preferred, although the space between open jaws 41, 42 may then need to be increased and the stroke of cylinder 43 correspondingly increased. Alternatively, the jaw action and spacing could remain as illustrated, and rod 49 could be selectively moved axially so as to selectively reposition the pop-up pin as previously described.

It should now be apparent that utilization of the pop-up device 51 as shown, or utilization of the modified forms of the pop-up device wherein differently configured structure is utilized (e.g., a pin fastened to the rod 49), is conducive to the practice of new and improved processes. Thus, by following the teachings contained herein, interpole wire segments may be consistently disposed within the periphery of a winding turn receiver by intercepting at a fixed location (e.g., with abutment means) a segment of wire extending between form means and a flyer prior to complete cessation of relative rotation between the form means and the flyer. Such interception by the abutment means then establishes an interpole winding segment extending between the abutment means and the form means and overlying clamp means conditioned for receipt of a part of such wire segment. Thereafter, movement of the last turn of a winding coil downwardly out of the winding plane causes the interpole wire segment to be seated between opposed but open clamp jaws. Subsequently, actuation of the clamp jaws (or other clamping means) consistently grips a part of the interpole wire segment. Due to the offset location of the form means and receiver (e.g., see FIGS. 4 and 5, the relative offset of axes 17 and 39, and the relative position of the clamping device), the clamped portion of the interpole wire overlies the interior of the winding turn receiver and ultimately is disposed therewithin as the next succeeding coil is formed.

Performance of yet another preferred method by utilzing the the bail 34, best illustrated in FIGS. 1, 5 and 6, will now be described. At the outset, it is noted that bail 34 is normally disposed out of (i.e., below) the winding plane as best shown in FIGS. 1 and 5. However, when desired, the bail 34 is moved upwardly to the position thereof shown in FIG. 6 by the action of rotary solenoid 37 (which may be the same model and type as the solenoid 46). Actuation of solenoid 37 causes cam 36 to rotate and drive bail 34 to its elevated position (as shown in FIG. 6). In its elevated position, bail 34 provides a ramp surface regardless of the direction of flyer rotation.

As will be appreciated from reviewing the above-referenced Lauer U.S. Pat. No. 3,765,080 and the above-referenced Arnold et al U.S. Pat. No. 3,973,601; consistent and accurate placement of the intercoil (i.e., intrapole) wire segments 33, 67, 68, and 69 heretofore would have required the use of very sophisticated coil form shapes, mechanisms, and controls for advancing or "jumping" the coil forms. In those applications where it is desired that the intercoil wire segments be located exteriorly of the turn receiving mechanism as shown in FIG. 4, the segment of wire that transitions from one stage of the winding form assembly to another winding stage thereof must be initially transitioned onto the next succeeding stage of the rear coil form part 14. As will be understood, the development of this transitioning segment is accomplished as the coil forms are jumped or advanced through the winding plane. The use of bail 34 assures that the segment 33 will be transitioned initially onto a subsequent winding stage of the rear part 14 of the coil form assembly.

A close review of FIGS. 5 and 6 better reveals the operation of bail 34. FIG. 5 illustrates the relative positions of the flyer, winding form, and bail 34 as turns prior to the last turn of the innermost coil 27 are being generated about the first winding stage of the coil form assembly 12. Then, during generation of the last turn for coil 27, the flyer 18 continues to rotate and the coil forms 12 are jumped downwardly relative to the winding plane to the position thereof shown in FIG. 6. However, as the winding forms jump downwardly, there is a tendency to pull the segment of wire extending between the forms and the flyer downwardly out of the winding plane, with the result that the intercoil wire segment may tend to actually be established in other than the desired location. This tendency is overcome when bail 34 is in its elevated position (as shown in FIG. 6). The intercoil winding segment 27 actually tends to be raised upwardly out of the winding plane and toward the next succeeding winding stage during the jump. The interaction of bail 34 and the wire segment insures that the intercoil winding segment will not drop below the winding plane. Thus, segment 33 is established as the flyer is generating a portion of a turn about the rear form part 14.

The bail 34 preferably is formed from a piece of one-eighth inch diameter soft steel having the ends thereof pivotally supported in a pair of brass pivot blocks 92, 93. The blocks 92, 93 in turn are fastened to the masking plate 44 (see FIG. 1). Thus, in its raised position, the bail 34 establishes an inclined ramp which assists in moving the intercoil winding segment onto a next succeeding winding stage of the form assembly when the form assembly is advanced or jumped during a high speed revolution of the flyer arm 18.

Our inventions have now been described with extensive reference, for purposes of illustration, to preferred methods and devices which may be utilized to carry out the invention. However, changes may be made therein without departing from the spirit of the invention. Therefore, while we have shown and described what at present are considered to be preferred and alternate embodiments of our invention in accordance with the patent statutes, changes may be made therein without actually departing from the true spirit and scope of the invention. Accordingly, we intend to cover in the following claims all such equivalent variations as fall within the invention.

What we claim as new and desire to secure by Letters Patent of the United States is:

1. A method of developing at least one coil group for a dynamoelectric machine stator, the at least one coil group comprising at least one coil having a plurality of turns, the method involving utilization of winding equipment and comprising the steps of: generating a number of winding turns for a given coil by relatively rotating wire dispensing means and form means so as to generate turns in a predetermined winding plane, whereby turns move away from the plane and toward a turn receiver spaced from the winding plane; generating a portion of a final turn of the given coil; and deflecting out of the winding plane and away from the turn receiver a segment of wire extending between the dispensing means and form means while relative motion between the dispensing means and form means continues, thereby to at least assist in the accurate placement of such segment relative to at least the form means.

2. The method of claim 1 wherein deflecting a segment of wire is performed by moving an inclined surface into interfering relation with the winding plane and the normal path of movement of the segment of wire.

3. The method of claim 2 wherein moving an inclined surface includes pivoting a bail into the path of the segment of wire.

4. The method of claim 2 further including moving the form means relative to the winding plane and toward the turn receiver while the inclined surface is in interfering relation with the normal path of movement of the segment of wire.

5. The method of claim 4 wherein the segment of wire forms an intercoil winding segment; moving the form means includes moving a first winding stage, corresponding to a first coil, out of the winding plane and a second winding stage, corresponding to a second coil, into the winding plane; whereby the segment of wire establishes the transition between the first and second winding stages.

6. The method of claim 5 wherein the turn receiver comprises a circular array of gap defining members, and the form means comprises a form assembly having a portion thereof disposed externally of the circular array, and wherein the method includes establishing the segment of wire along said portion of the form assembly.

7. The method of claim 1 wherein the dispensing means is a rotatable flyer, and deflecting a segment of wire is performed as the rotatable flyer is decelerating toward a dwell position.

8. The method of claim 7 wherein the equipment includes wire abutment means, and clamping means positioned generally between the form means and wire abutment means, and wherein the method includes: arresting, with the abutment means, continued movement of the deflected segment of wire as a portion of the deflected segment becomes aligned with the clamping means and before cessation of movement of the rotatable flyer.

9. The method of claim 7 further including the steps of: assuring that all winding turns are contained in the turn receiver; moving said portion of the deflected segment into registry with the clamping means; and clamping said portion with the clamping means.

10. The method of claim 9 further including the step of indexing the turn receiver relative to the form means, and thereafter generating a number of winding turns for another given coil.

11. A method of developing, for a dynamoelectric machine stator, at least two wound poles comprised of at least one coil each of magnet wire and interconnected by an interpole wire segment, the method involving utilization of winding equipment having form means, a turn receiver, magnet wire dispensing means, clamp means, and abutment means, the method comprising the steps of: generating a number of winding turns for at least one coil of a first pole by relatively rotating the magnet wire dispensing means and the form means so as to generate turns in a predetermined winding plane, with initially formed turns moving out of the plane and toward the turn receiver spaced from the winding plane as turns subsequent to the initial turns are generated in the winding plane; generating a portion of a final turn of the first pole and intercepting, with the abutment means, a segment of wire extending between the dispensing means and form means while relative motion between the dispensing means and form means continues; arresting, with the abutment means, continued movement of the intercepted segment of wire as a portion of the segment becomes aligned with the clamp means; assuring that all of the winding turns of the first pole are contained in the turn receiver and moving a portion of the segment of wire into registry with the clamp means; and clamping with the clamp means said portion of wire in registry with the clamp means thereby to establish a first interpole wire segment.

12. The method of claim 11 further including indexing the turn receiver relative to the form means, generating at least some turns of a second pole, and releasing the clamped portion of the interpole wire segment.

13. The method of claim 12 wherein the turn receiver comprises a circular array of axially extending gap defining members, the form means comprises a form assembly having a portion thereof disposed in overlying relation to a first region within the perimeter of the gap defining members, and the clamp means is disposed in overlying relation to a second region within the perimeter of the gap defining members, and wherein the method further comprises positioning the previously clamped portion of the interpole wire segment within the perimeter of the gap defining members.

14. The method of claim 13 further comprising repeating at least the aforesaid steps and thereby forming a second pole and a second interpole wire segment.

15. The method of claim 13 wherein the abutment means includes two abutment surfaces, a first one of which is utilized to intercept and arrest the first interpole segment, and wherein turns of the second pole are generated in an opposite rotational sense as compared to the turns of the first pole, and wherein an interpole winding segment at the end of the second pole is intercepted and arrested, while the wire dispensing means decelerates to a dwell conditions, by the second one of the abutment surfaces.

16. The method of claim 11 wherein the step of intercepting a segment of wire includes raising at least one abutment surface into the winding plane.

17. The method of claim 11 wherein the step of raising at least one abutment surface into the winding plane includes raising a pin into the winding plane.

18. The method of claim 17 further comprising adjusting the lateral position of the pin relative to the clamp means.

19. The method of claim 16 further comprising raising into the winding plane a pop-up device having a pair of ramp surfaces and a pair of abutment surfaces.

20. In apparatus for developing a plurality of coil groups for dynamoelectric machines wherein each coil group comprises at least one coil of a plurality of turns of magnet wire and adjacent coil groups are interconnected by interpole wire segments; and wherein the apparatus includes turn sizing means for determining the size of winding turns, magnet wire dispensing means movable relative to the turn sizing means for generating winding turns in a predetermined winding plane, turn receiving means for receiving winding turns from the turn sizing means while other subsequent winding turns are being generated, and clamp means for clamping the interpole wire segments, the improvement comprising: abutment means for intercepting an interpole wire segment extending between said dispensing means and turn sizing means before cessation of relative movement between said turn sizing means and said dispensing means, and for aligning the interpole wire segment with said clamp means.

21. The apparatus of claim 20 wherein said turn receiving means comprises a circular array of a plurality of longitudinally extending gap defining members positioned adjacent to, but spaced from the winding plane, and wherein the clamp means overlies an area having a perimeter determined by said circular array.

22. The apparatus of claim 20 wherein the abutment means comprises a pop-up device having a portion selectively movable into the winding plane.

23. The apparatus of claim 22 wherein the pop-up device defines two spaced apart wire intercepting surfaces whereby one surface can intercept an interpole wire segment moving in one direction, and the other surface can intercept an interpole wire segment moving in a direction opposite to the one direction.

24. The apparatus of claim 23 wherein the pop-up device includes a pin movable into the winding plane.

25. The apparatus of claim 23 wherein the pin is laterally movable to two different predetermined positions in response to direction of movement of an interpole wire segment.

26. The apparatus of claim 23 wherein the pop-up device defines two spaced apart inclined ramp surfaces adapted to project angularly through the winding plane and two spaced apart mutually facing abutment surfaces.

27. The apparatus of claim 20 further including movable ramp means movable into the winding plane for assuring accurate placement of intercoil winding segments.

28. The apparatus of claim 27 wherein the movable ramp means comprises a bail pivotally supported below the winding plane.

29. In apparatus for developing at least a plurality of interconnected magnet wire coils for dynamoelectric machines wherein each coil comprises a plurality of turns of magnet wire; and wherein the apparatus includes a multiple winding stage coil form assembly movable so that different winding stages are disposed in a winding plane, magnet wire dispensing means rotatable about the coil form assembly for generating winding turns in the winding plane, and turn receiving means for receiving winding turns from the form assembly; the improvement comprising: ramp means normally disposed in noninterfering relation with the winding plane but selectively movable into an active position in the winding plane so as to be in interfering relation with wire segments movable in such plane, and means for moving the ramp means to said active position as said form assembly moves and a subsequent winding stage is advanced in a first direction into the winding plane; said ramp means being operative to urge a given segment of wire moving therepast in a direction opposite to the first direction, whereby such given segment is prevented from moving in the first direction with the form assembly and whereby such given segment is constrained to establish an intrapole connection between two coils of a group of magnet wire coils.

30. The apparatus of claim 29 wherein the ramp means includes a bail that is operative for interfering with a wire segment for both clockwise and counterclockwise rotation of the magnet wire dispensing means relative to the form assembly.

31. The apparatus of claim 30 wherein the apparatus includes a masking plate disposed adjacent to the winding plane, the wire dispensing means includes a flyer, and said bail is pivotally supported by the masking plate.

32. The apparatus of claim 30 wherein the apparatus further comprises a pop-up device having abutment surface means selectively movable into the winding plane for establishing the location of an interpole wire segment extending between the form assembly and wire dispensing means while the wire dispensing means is moving relative to the form assembly.

33. Apparatus for developing at least a plurality of interconnected magnet wire coils for dynamoelectric machines wherein each coil comprises a plurality of turns of magnet wire; and wherein the apparatus includes a multiple winding stage coil form movable so that different winding stages thereof are disposed in a winding plane, flyer means rotatable about the coil form assembly for generating winding turns in the winding plane, and turn receiving means for receiving winding turns from the coil form; the improvement comprising: ramp means normally disposed in noninterfering relation with the winding plane but selectively movable into an active position in the winding plane so as to be in interfering relation with a wire segment movable in such plane and extending between the first stage of the form and flyer means, and means for moving the ramp means to said active position as said form assembly moves in a first direction so that a first winding stage moves out of the winding plane in the first direction and a subsequent winding stage is advanced in a first direction into the winding plane; said ramp means being operative to at least tend to urge the segment of wire in a direction opposite to the first direction, whereby such segment is prevented from moving in the first direction with the form assembly and segment is constrained to establish an intrapole connection between first and second coils comprised of wire turns generated about the first and subsequent winding stages respectively.

34. The apparatus of claim 33 wherein the ramp means includes a bail that is operative to interfere with movement of a wire segment during clockwise and also counterclockwise rotation of the flyer means relative to the coil form.

35. The apparatus of claim 34 wherein the apparatus includes a masking plate disposed adjacent to the winding plane, and said bail is pivotally supported by the masking plate.

36. The apparatus of claim 35 wherein the apparatus further comprises a pop-up device having abutment surface means selectively movable into the winding plane for establishing the location of an interpole wire segment extending between the coil form and flyer means while the flyer means is moving relative to the coil form.

37. The apparatus of claim 36 further comprising a rod supported by the masking plate, and in turn supporting the pop-up device, and means for rotating said rod thereby to raise and lower the pop-up device.

38. The apparatus of claim 37 wherein the pop-up device includes two spaced apart wire abutment regions.

39. The apparatus of claim 38 wherein the pop-up device comprises a pin fastened to said rod.

40. The apparatus of claim 39 further including means for longitudinally shifting the position of said rod and thus the position of said pin relative to the coil form.

* * * * *